United States Patent
Fino et al.

(10) Patent No.: US 9,037,990 B2
(45) Date of Patent: May 19, 2015

(54) AUTOMOTIVE USER INTERFACE FOR A VENTILATION SYSTEM OF A MOTOR VEHICLE

(75) Inventors: Federica Fino, Orbassano (IT); Diego Marzorati, Orbassano (IT); Giovanni Boreanaz, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 297 days.

(21) Appl. No.: 12/562,598

(22) Filed: Sep. 18, 2009

(65) Prior Publication Data

US 2010/0095245 A1 Apr. 15, 2010

(30) Foreign Application Priority Data

Sep. 19, 2008 (EP) .................................... 08425612

(51) Int. Cl.
*G06F 3/048* (2013.01)
*G06F 3/033* (2013.01)
*G06F 3/041* (2006.01)
*G06F 3/038* (2013.01)
*H03M 11/00* (2006.01)
*G06F 3/044* (2006.01)
*B60H 1/00* (2006.01)

(52) U.S. Cl.
CPC .......... *B60H 1/00985* (2013.01); *B60H 1/0065* (2013.01)

(58) Field of Classification Search
USPC .................. 715/771, 834; 345/157, 173, 204; 341/34; 178/18.06; 700/276
See application file for complete search history.

(56) References Cited

U.S. PATENT DOCUMENTS

| | | | |
|---|---|---|---|
| 2002/0015034 A1* | 2/2002 | Malmborg | 345/204 |
| 2003/0070437 A1* | 4/2003 | Hafner et al. | 62/127 |
| 2004/0181376 A1* | 9/2004 | Fables et al. | 703/6 |
| 2005/0133347 A1* | 6/2005 | Hein | 200/5 R |
| 2009/0090568 A1* | 4/2009 | Min | 178/18.06 |
| 2009/0140993 A1* | 6/2009 | Han et al. | 345/173 |
| 2009/0244413 A1* | 10/2009 | Ishikawa et al. | 349/12 |
| 2009/0312900 A1* | 12/2009 | Tschirhart | 701/36 |

FOREIGN PATENT DOCUMENTS

| | | |
|---|---|---|
| DE | 102004031659 A1 | 6/2006 |
| DE | 202006003543 U1 | 6/2006 |
| EP | 1291205 A2 | 3/2003 |

OTHER PUBLICATIONS

"European Application Serial No. 08425612.2, European Search Report mailed Feb. 18, 2009", 3 pgs.

* cited by examiner

*Primary Examiner* — Alvin Tan
*Assistant Examiner* — Rinna Yi
(74) *Attorney, Agent, or Firm* — Schwegman Lundberg & Woessner, P.A.

(57) ABSTRACT

An automotive user interface for controlling the temperature, the distribution and of the air flow rate in a ventilation system of a motor vehicle. The automotive user interface comprises: a touch-sensitive control display unit, which comprises light-emitter diodes structured for providing a visual representation of temperatures that can be set by a user according to a generally circular arrangement; an optically semitransparent touch-sensitive control panel superimposed on the light-emitter diodes in a position corresponding to an area for setting the temperature; and an electronic control unit connected to the light-emitter diodes and to the control panel for controlling the temperature of the air in the ventilation system and the light-emitter-diode means in response to an action of touch contact by a user on the area for setting the temperature.

18 Claims, 3 Drawing Sheets

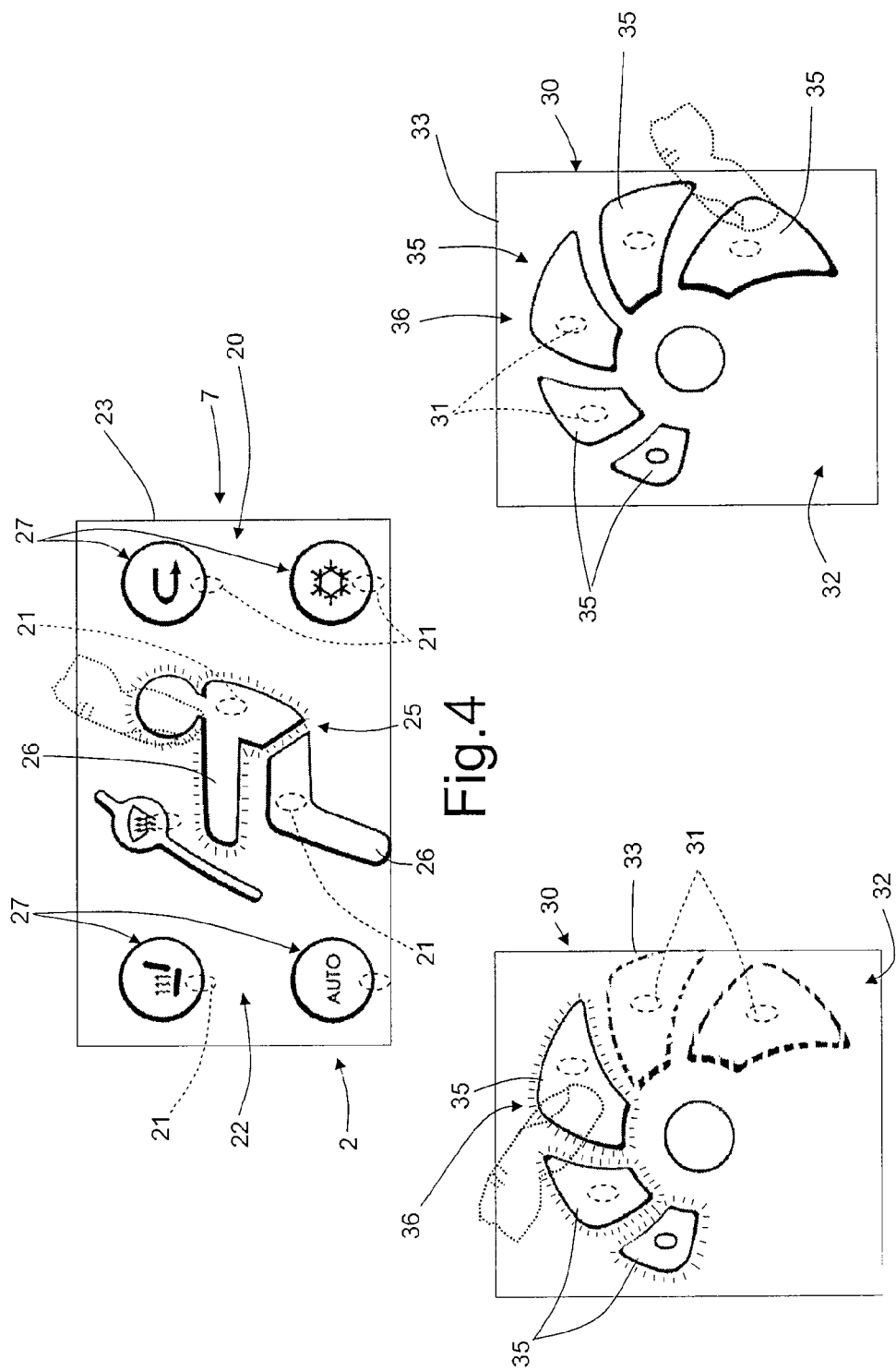

AUTOMOTIVE USER INTERFACE FOR A VENTILATION SYSTEM OF A MOTOR VEHICLE

RELATED APPLICATION

This application claims the benefit of priority, under 35 U.S.C. Section 119, to Euoropean Patent Application Serial No. 08425612.2, filed on Sep. 19, 2008, which is incorporated herein by reference in its entirety.

The present description relates to an automotive user interface for a ventilation and/or air-conditioning system of a road motor vehicle. In particular, the present description relates to an automotive user interface provided with a control panel set in the passenger compartment of the motor vehicle in a position corresponding to the dashboard for enabling the user to adjust the temperature, the distribution, and the flow of conditioned air introduced into the passenger compartment of the motor vehicle, and with an electronic control unit connected to the control panel for controlling the ventilation and/or air-conditioning system according to the commands imparted by the user through the control panel itself.

BACKGROUND

As is known, one of the needs felt by automobile manufacturers is to be able to provide a user interface for controlling the ventilation and/or air-conditioning system of the type described above, structured in such a way that its use, i.e., the selection of the commands by the user is extremely simple, practical, and immediate, and at the same time is economically advantageous to produce.

For this purpose numerous efforts have been made by the aforesaid manufacturers for developing user interfaces for controlling the ventilation and/or air-conditioning systems that will be particularly inexpensive and will present a good degree of "usability", i.e., will be simple and intuitive, but there still remains much to be done.

SUMMARY

One aim of the examples disclosed herein is consequently to provide an automotive user interface for a ventilation and/or air-conditioning system presenting a high degree of usability for the user, i.e., the selectable controls of which for governing the ventilation and/or air-conditioning system will be extremely simple, clear, "natural" and intuitive, and the graphic representation of which will recall immediately the function, will be practical and straightforward to use and, at the same time, can be produced at low cost.

Provided according to several examples are an automotive user interface for a ventilation and/or air-conditioning system of a road motor vehicle, a ventilation and/or air-conditioning system for a road motor vehicle provided with said automotive user interface, and a road motor vehicle provided with said ventilation and/or air-conditioning system, as defined in the attached claims.

BRIEF DESCRIPTION OF THE DRAWINGS

One or more examples will now be described with reference to the attached drawings, which illustrate a non-limiting example embodiment thereof, and in which:

FIG. 4 is a schematic illustration of an area for setting the distribution of the air of the automotive user interface of the vehicle shown in FIG. 1; and FIGS. 5 and 6 are schematic illustrations of an area for setting the flow rate of air of the automotive user interface of the vehicle shown in FIG. 1 in as many operating conditions for selection of the flow rate.

DETAILED DESCRIPTION

Figure 1:
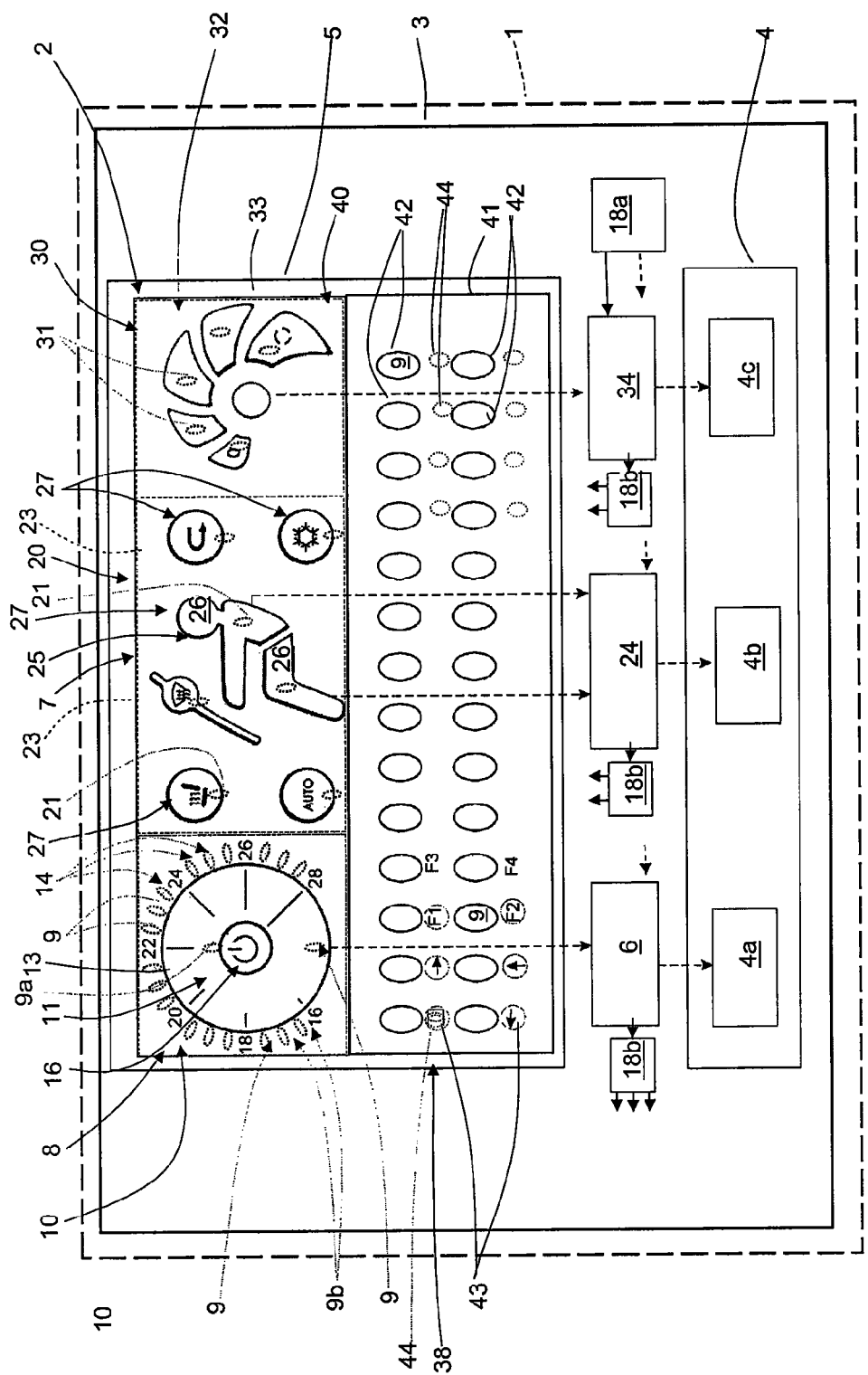
FIG. 1 is a block diagram of a vehicle provided with an automotive user interface for controlling a ventilation and/or air-conditioning system of the vehicle, provided according to the teachings of the present description.

With reference to FIG. 1, number 1 designates as a whole a road motor vehicle provided with a ventilation and/or air-conditioning system 4 and an automotive user interface 2 installed in the passenger compartment 3 or cab of the motor vehicle 1 for controlling the temperature, the distribution, and the air flow rate in the ventilation and/or air-conditioning system 4.

The ventilation and/or air-conditioning system 4 basically comprises: a generator circuit for generating conditioned air (not illustrated) communicating with the passenger compartment 3 of the motor vehicle 1 through louvers (not illustrated); an adjustment unit 4a designed to vary the temperature of the conditioned air produced by the air-generator circuit; an adjustment unit 4b designed to vary the direction/directions of introduction of the flow/flows of air emitted by the air-generator circuit into the passenger compartment 3; and an adjustment unit 4c designed to vary the flow of air, i.e., ventilation of the air introduced by the generator circuit into the passenger compartment 3 itself. The ventilation and/or air-conditioning system 4 and in particular, the air-generator circuit and the adjustment units 4a, 4b and 4c are known devices and consequently will not be further described.

With reference to FIG. 1, the user interface 2 is set preferably, but not necessarily, in a position corresponding to the dashboard 5 of the motor vehicle 1, and is structured for enabling the user to impart on the ventilation and/or air-conditioning system 4 the following commands: commands for adjustment of the temperature of the conditioned air introduced into the passenger compartment 3 of the motor vehicle 1; commands for adjustment of the distribution of the conditioned air introduced into the passenger compartment 3 of the motor vehicle 1, through the selection of the direction/directions of introduction of the conditioned air into the passenger compartment 3; commands for adjustment of the flow rate of conditioned air introduced into the passenger compartment 3 of the motor vehicle; and a series of additional commands for turning-on of the air conditioner, for air recirculation, for selection of automatic air conditioning and, possibly, for heating seats in vehicles provided with said function (OPT).

The user interface 2 basically comprises a touch-sensitive control display unit 7, through which the user is able to impart on the ventilation and/or air-conditioning system 4 the aforesaid commands for adjustment of the temperature, and distribution and air flow rate.

In particular, with reference to FIG. 1, the touch-sensitive control display unit 7 is provided with a control device 8 for management and/or adjustment of the temperature, which is structured for enabling the user to set the temperature, and comprises a series of light-emitting devices 9, such as for example LEDs, arranged according to a substantially circular geometry and structured for providing a visual representation of the temperatures that can be set by a user.

The control device 8 further comprises: an optically semi-transparent and touch-sensitive control panel 10, which is superimposed on the light-emitting devices 9; and an electronic control unit 6, which is connected to the light-emitting devices 9 and to the touch-sensitive control panel 10 for controlling both the temperature of the ventilation and/or air-conditioning system 4 and the light-emitting devices 9 in response to an action of touch contact of a user on the touch-sensitive control panel 10.

In particular, the electronic control unit 6 can comprise, for example, a microprocessor, and is designed to receive at input the commands imparted by the user through the action of touch contact of the user on the touch-sensitive control panel 10 and generates, according to said commands, control signals to be imparted on the unit 4a of the ventilation and/or air-conditioning system 4 so as to perform adjustment of the temperature, and at the same time command signals to be imparted on the light-emitting devices 9 so as to signal visually to the user the temperature set.

The control panel 10 is of a touch-sensitive type, is obtained preferably but not necessarily with a capacitive technology, and is structured in such a way as to present, on its own surface in view, i.e., on the front surface (represented in FIG. 1), a circular display reference element 13, which circumscribes a circular portion of contact for selection of the temperature, indicated hereinafter with a slider wheel 11 or touch-sensitive ring.

As regards, instead, the light-emitting devices 9, they can correspond to LEDs, or to any similar light source, and are set facing the surface not in view of the touch-sensitive control panel 10 according to a substantially circular geometry in such a way that turning-on thereof can be seen by a user on the surface in view of the touch-sensitive control panel 10 in the form of corresponding marks 14 for displaying the temperature.

In the case in point, in the example shown in FIG. 1, the light-emitting devices 9 are arranged in such a way that the corresponding display marks 14 will be arranged on the surface in view of the touch-sensitive control panel 10 around the circular display element 13 in radial and angularly distributed positions so as to define, together with the circular display element 13, a graduated scale for setting the temperature.

Figure 2:
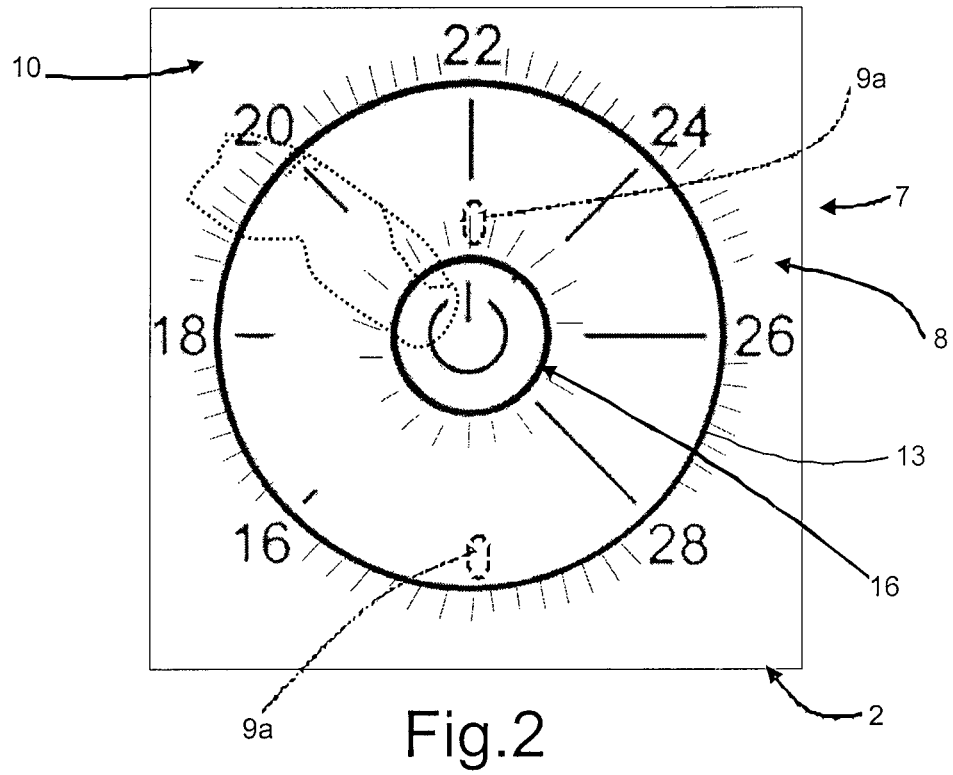
FIGS. 2 and 3 are schematic illustrations of an area for setting the temperature of the automotive user interface of the vehicle shown in FIG. 1 in a first operating condition and second operating condition for selecting the temperature.
Figure 3:
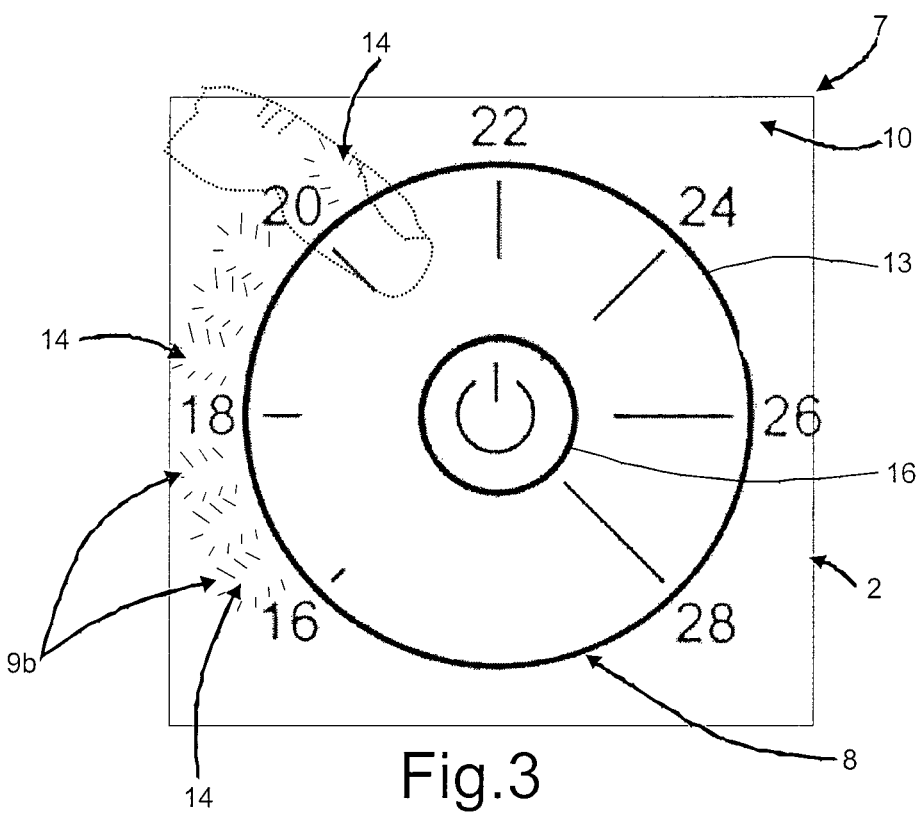

In the example shown in FIGS. 1, 2 and 3, the circular display element 13 is defined by a ring or circle arranged around which are temperature reference numbers in positions set at angular distances apart from one another, whilst the display marks 14, generated on the control panel 10 around the slider wheel 11 following upon turning-on of the light-emitting devices 9, are circularly distributed around the circular display element 13.

Each mark 14 represents a projection of the light generated by a respective emitting device 9 on the control panel 10 and is designed to pass from a state of visibility, following upon turning-on of a corresponding light-emitting device 9, to a state of non-visibility, when the corresponding light-emitting device 9 is inactive.

The display marks 14 hence represent on the control panel 10 the temperature selected by the user and are designed to be visible on the surface in view of the control panel 10 in such a way as to surround both the circular display element 13 and the slider wheel 11.

The control panel 10 further comprises a graphic representation of a pushbutton 16, which is set at the centre of the sliding wheel 11 and hence of the circular display element 13 and has the function of enabling the user to impart a command of turning-on/turning-off of the control display unit 7.

With reference to FIG. 1, the front surface, i.e., the surface in view of the control panel 10 is configured in such a way as to present preferably, but not necessarily, a black colour (for reasons of clarity the surface in view of the control panel 10 in the attached figures has been represented with a white colour) whilst the pushbutton 16, the circular display element 13 and the marks 14, in use, are designed to present a profile of a substantially white colour in such a way that they can be conveniently distinguished from the remaining black background of the surface in view of the control panel 10.

In particular, display of the marks 14, of the pushbutton 16, and of the circular display element 13 is activated through a command for turning-on of the light-emitting devices 9 that will backlight the control panel 10.

In the example shown in FIG. 1, the light-emitting devices 9 comprise: one or more LEDs 9a, which are set facing the rear surface of the control panel 10, i.e., opposite to its surface in view, for lighting the display element 13 and the graphic representation of the pushbutton 16, hence rendering them visible on the surface in view; and a plurality of LEDs 9b set facing the rear surface of the control panel 10 according to a circular geometrical configuration in such a way as to generate on the surface in view of the panel 10 a respective display mark 14.

In the above description it should be pointed out that the LEDs 9a and/or 9b may be, for example, conveniently micro LEDs of the SMD type and have a dimension preferably, but not necessarily, of approximately 6 mm.

With reference to FIG. 1, the user interface 2 is moreover provided with a lighting sensor 18a and a power-adjustment module 18, which is connected to the lighting sensor 18a, to the electronic control unit 6, and to the LEDs 9a and 9b for controlling the electric power supplied thereto according to the light intensity detected by the lighting sensor 18a. In this way, there is conveniently carried out a regulation of the intensity of the light introduced by the LEDs 9 on the basis of the environmental lighting, in such a way that the white profiles of the marks 14 and/or of the pushbutton 16 and/or of the circular element 13 will be perceivable and hence easily distinguishable in any condition of lighting inside the passenger compartment. For example, the user interface 2 can recognize an emission by the LEDs 9 of a white light that is more intense than a nominal intensity value in environmental daylight conditions, or else a white light less intense than a nominal intensity value in conditions of night visibility or when travelling through a tunnel.

It should moreover be added that the combined use of a control panel 10 of a touch-sensitive type and of a set of LEDs 9a and 9b facing the control panel 10 for the control panel 10 itself in response to an action of touch contact, proves particularly advantageous in so far as it enables reduction of the costs of production of the user interface as compared to a use therein of an electronic panel of a touch-screen type, which, as is known, presents an extremely costly technology.

With reference to FIGS. 2 and 3, operation of the control device 8 of the user interface 2 described above is substantially based upon three different operating conditions: a first operating condition, or key-off condition, in which, given that the user interface 2 is not supplied by electric power, is completely inactive, i.e., off, and the setting controls of which are not visible to the user; a second operating condition or key-on condition, in which the user interface 2 is in standby, i.e., is waiting for a touch command of activation by the user (illustrated in FIG. 2); and a third operating condition, or setting condition, in which the user interface 2 is completely active for enabling the user to set the temperature (illustrated in FIG. 3).

In particular, in the first operating key-off condition, the user interface 2 is not supplied by electric power, and consequently the light-emitting devices 9 are off, the control panel 10 is not backlighted, and hence the display element 13, the pushbutton 16, and the display marks 14 are not visible to the user. In other words, in this condition, the circular display element 13, the pushbutton 16, and the marks 14 are not distinguishable from the remaining background of the control panel 10, which in this condition consequently has a surface in view that is completely homogeneous and black. In this condition, the surface in view of the control panel 10 is uniformly black, and the commands for selection of the temperature are not visible to the user.

With reference to FIG. 2, in the second operating condition, i.e., in the key-on condition of the user interface 2, the electronic control unit 6 activates the LEDs 9a in such a way as to backlight the circular display element 13 and the pushbutton 16, hence rendering them visible to the user, and at the same time keeps the LEDs 9b turned off in order not to project any mark 14 on the panel 10.

In particular, the LEDs 9a can emit, for example, a light of a white colour in such a way as to highlight conveniently with white the circular display element 13 and the pushbutton 16 with respect to the surface in view of a black colour of the control panel 10.

It should be pointed out that the electronic control unit 6 can be programmed for controlling the adjustment module 18 so as to vary the intensity of the light introduced by the LEDs 9a and/or by the LEDs 9b in such a way as to reduce it partially, as compared to a nominal value of light intensity in conditions of low environmental lighting, for example, at night, or else increase it in conditions of high environmental lighting, for example, during the day time in such a way that the controls will be conveniently visible notwithstanding the presence of other light sources that are potentially of disturbance.

The user interface 2 passes from the second operating condition to the third operating condition when the user touches the surface in view of the control panel 10 in a position corresponding to the pushbutton 16 (shown in FIG. 2) determining turning-on of the conditioned-air adjustment unit 4a.

In this step, the electronic control unit 6 sensibly increases the intensity of the light introduced by the LEDs 9a and/or changes the colour thereof, passing from white to green, in such a way as to highlight more the display element 13 and the pushbutton 16 so as to signal visually to the user the condition of activation of the touch-sensitive slider wheel 11 for selection/setting of the temperature. The electronic control unit 6 can moreover control the LEDs 9b in such a way as to generate all the marks 14 that surround the slider wheel 11 with a light having a first level of intensity in such a way as to render them partially visible to the user, who at this point can set the temperature.

In particular, the selection of the temperature by the user can occur according to a "discrete" adjustment mode or a "continuous" adjustment mode, which are both actuated by the user by touching the slider wheel 11 present on the control panel 10, and in which the electronic control unit 6 controls the LEDs 9b associated to the temperature selected so as to generate instantaneously the corresponding marks 14 on the panel 10.

According to a possible embodiment, backlighting of the panel 10 can be implemented in such a way as to determine generation of the marks 14 corresponding to the temperature selected with a light having a second level of intensity higher than first level of light intensity in such a way as to highlight them and render them more visible to the user as compared to the other marks 14 corresponding to the temperatures not selected.

In particular, the discrete adjustment mode recognizes that, following upon detection of a touch contact on a sector of the slider wheel 11, the electronic control unit 6 will increase the light intensity introduced by the LEDs 9b associated to the marks 14 comprised in the range delimited between the sector of the slider wheel 11, corresponding to the minimum selectable temperature and the sector of the slider wheel 11 touched by the user, i.e., corresponding to the temperature selected.

In other words, the discrete adjustment mode recognizes that the user will click on the slider wheel 11 for selecting/setting the temperature on the sector corresponding to the desired temperature rendering more visible on the control panel 10 both the mark 14 present in a position corresponding to the sector touched by the user, which corresponds to the temperature selected, and the remaining marks 14 associated to the temperatures lower than the required temperature.

The continuous adjustment mode recognizes, instead, that selection of the temperature will occur through a movement of touch sliding on the part of the user, with the tip of his finger on the slider wheel 11 and will terminate in a position corresponding to the sector for the desired temperature. In this case, the electronic control unit 6 turns on sequentially the LEDs 9b following instant by instant the touch contact made by the user on the sectors of the slider wheel 11, consequently determining a sequential generation of temperature marks 14 on the panel 10.

It should be pointed out that the colours of the marks 14 can be divided into sectors, in which blue is associated to low temperatures and red is associated to high temperatures.

For example, the display marks 14 can present alternating colours divided by pre-set intervals of temperatures. In the case in point, a generation of marks 14 on the panel 10 associated to the low temperatures can be provided with a blue colour, whilst the marks 14 associated to the high temperatures, comprised between 20 and 24° C., can be red or else could have alternating red and blue colours.

With reference to FIGS. 1 and 4, the control display unit 7 is provided with a control device 20 for controlling the distribution of the conditioned and/or ventilated air inside the passenger compartment 3 or cab of the motor vehicle 1, which is structured for enabling the user to determine the distribution of the air and comprises a series of light-emitting devices 21 designed to provide a visual representation of the distributions of the air that can be set by a user.

The control device 20 further comprises: an optically semi-transparent touch-sensitive panel 22, provided preferably but not necessarily with a capacitive technology, which is superimposed on the light-emitting devices 21 in a position corresponding to an area 23 for selecting the distribution of the air; and an electronic control unit 24, which is connected to the light-emitting devices 21 and to the panel 22 for controlling both the distribution of the ventilation and/or air-conditioning system 4, and the light-emitting devices 21 in response to an action of touch contact by a user on the area 23 for selection of the air distribution.

In particular, the panel 22 has a selector control 25 for selecting distribution of the air in the passenger compartment and/or cab, which comprises a series of portions of selection area 26, which can be activated by contact, i.e., they are touch-sensitive, and graphically represented on each of which is, in a schematic way, a portion of a human body towards which the ventilation of the air can be directed, and in which assemblage of the graphic representations of the portions of area 26 defines as a whole a person schematically represented in a sitting position.

In particular, in the example illustrated in FIGS. 1 and 4, the selector control 25 comprises a portion of selection area 26 associated to the control of ventilation of the top portion of the user's body, and a portion of selection area 26 associated to the control of ventilation of the bottom portion of the user's body.

The control device 20 of the user interface 2 further comprises portions of selection area 27, which also can be activated by contact, i.e., they are touch-sensitive, each of which performs the function of a pushbutton for activation/de-activation of an auxiliary cooling/heating function and contains an icon or symbol that represents the function itself for the user.

In particular, in the example illustrated in FIGS. 1 and 4, the control device 20 comprises four portions of selection area 27 designed to perform the function of pushbuttons for selection of a function for activation/de-activation of the conditioned air, of a function for recirculation of the air inside the passenger compartment 3, of a function AUTO for automatic adjustment of the temperature according to a pre-set comfort profile, and of a function of heating of the seat.

The control device 20 further comprises a portion of selection area 27, which also can be activated by contact, i.e., is touch-sensitive, and is designed to perform the function DEF for demisting of the windscreen of the motor vehicle 1.

As regards the light-emitting devices 21 of the control device 20, they comprise a set of LEDs, which are arranged appropriately facing the rear surface of the panel 22 in such a way that turning-on thereof will determine display of the portions of selection area 26 and 27.

The LEDs are moreover connected to an adjustment module 18 that varies the light intensity of the light generated thereby.

Operation of the control device 20 of the user interface 2 described above is essentially based upon two different operating conditions: a first operating condition, or key-off condition, in which the user interface 2 is completely inactive, i.e., off, and hence not visible to the user; and a second operating condition, or key-on condition, in which the portions of selection area 26 and 27 are visible, and the controls of which can be activated through a contact by the user thereon (FIG. 4).

In particular, in the first operating key-off condition, the control device 20 of the user interface 2 recognizes that the portions of selection area 26 and 27 will not be backlighted and will hence not be visible. In this step, the electronic control unit 6 keeps the light-emitting devices 21 turned off in such a way that the control panel 22 will present a completely coloured homogeneous area, for example, black, in which the selector control 25 and the pushbuttons associated to the portions of selection area 27 are not visible on the control panel 10 (FIG. 4).

In the second operating condition, i.e., in the key-on condition of the user interface 2, the electronic control unit 6 activates the light-emitting devices 21 in such a way as to backlight each portion of selection area 26 and 27 hence rendering them visible on the control panel 10.

In particular, the LEDs 28 can emit, for example, a white light in such a way as to highlight conveniently the portions of selection area 26 and/or 27 with white. It should be pointed out that the electronic control unit 6 can be programmed for controlling the adjustment module 18 so as to vary the intensity of the light introduced by the light-emitting devices 21 in such a way as to decrease it partially, with respect to a nominal value of light intensity in conditions of low environmental lighting, for example at night, or else increase it in conditions of high environmental lighting, for example during the day.

The generation of the command by each portion of selection area 26 or 27 occurs when the latter is touched by the user. In detail, the contact of a portion of selection area 26 and/or 27 determines the generation of the corresponding command, which is sent to the electronic control unit 6, which on the one hand implements the function associated to the command itself and on the other changes the state of backlighting of the area 26 and 27 itself.

In the case in point, the electronic control unit 6 can be programmed in such a way as to change the colour, for example green, of the light introduced by the light-emitting devices 21 towards each portion of selection area 26 and 27 when the latter is touched by the user.

With reference to FIGS. 1, 5, and 6, the control display unit 7 is provided with a ventilation control device 30, which is structured for enabling the user to adjust the flow of air introduced into the passenger compartment 3 or cab of the motor vehicle 1, and comprises a series of light-emitting devices 31, such as for example LEDs, designed to provide a visual representation of the flow rate of air adjusted by the user.

The control device 30 further comprises: an optically semi-transparent touch-sensitive panel 32, obtained preferably but not necessarily with capacitive technology, which is superimposed on the light-emitting devices 31 in a position corresponding to an area for selecting 33 the flow rate of air; and an electronic control unit 34, which is connected to the light-emitting devices 31 and to the panel 32 for controlling both the flow of air generated by the ventilation and/or air-conditioning system 4 and the light-emitting devices 31, in response to an action of touch contact of a user on the area 33 for selecting the flow rate of air.

In particular, the selection area 33 of the panel 32 is graphically represented on the front surface of the panel 32 itself via a series of fan blades 35 arranged in radial positions and angularly spaced apart and having progressively increasing dimensions, and in which the assemblage of the graphic representation of the blades 35 represents as a whole a fan 36 illustrated schematically.

In greater detail, the light-emitting devices 31 comprise LEDs set facing the rear surface of the panel 32 in such a way as to be able to backlight the graphic representations of the fan blades 35, whilst the electronic control unit 34 is designed to activate the LEDs in such a way as to light up the graphic representation of each blade 35 following upon an action of touch contact on the blade 35 itself.

Operation of the control device 30 of the user interface 2 described above is based essentially upon two different operating conditions: a first operating condition, or key-off condition, in which the user interface 2, given that it is not supplied by an electric power, is inactive, i.e., off, and consequently the fan 36 is not visible to the user; and a second operating condition, or key-on condition, in which the user interface 2, being supplied by an electric power, renders the fan 36 visible.

In particular, in the first operating key-off condition, the LEDs 31a remains off, and the blades 35 are not distinguishable from the background of the surface in view of the control panel 10. In other words, in this step the surface in view of the control panel 10 associated to the selection area 33 is completely black.

In the second operating condition, i.e., in the key-on condition of the user interface 5, the electronic control unit 6 activates the LEDs 31a in such a way as to back-light in a diffused way, i.e., with a first light intensity, the blades 35 of the fan 36 in such a way as to render them partially visible to the user.

In this step, the control device 30 consequently remains in a standby condition waiting for selection of the flow rate of air by the user. In greater detail, in this step, the light-emitting devices 31 can emit, for example, a white light with low intensity in such a way as to highlight conveniently the blades 35 that make up the fan 36, whilst a LEDs 31 can emit a green light colour in such a way as to highlight conveniently a blade 35 associated to a zero ventilation.

It should be pointed out that the electronic control unit 6 can be programmed for controlling the adjustment module 18b so as to vary the intensity of the light introduced by the light-emitting devices 31 according to the light intensity detected by the lighting sensor 18a. In this way, the adjustment module 18b can control a partial reduction of the light intensity emitted by the LEDs 31, with respect to a nominal value of light intensity in conditions of low environmental lighting, for example at night, or else an increase thereof in conditions of high environmental lighting, for example, during the day.

The selection of the air flow rate by the user can occur according to a discrete adjustment mode or a continuous adjustment mode, both implemented through the contact of the blades 35.

In particular, the discrete adjustment mode recognizes that, following upon detection of an action of touch contact on a blade 35, the electronic control unit 34 will activate the light-emitting devices 31, i.e., the LEDs associated to the blades 35 comprised in the portion of the arc of a circumference delimited between the blade 35 corresponding to the minimum selectable flow rate, for example the zero flow rate, and the blade 35 corresponding to the selected flow rate.

In other words, the discrete adjustment mode recognizes that the user will click, i.e., will touch the control panel 10, on the blade 35 corresponding to the desired flow rate of air, determining a turning-on or an increase of the light intensity of the LED associated to the blade 35 itself and of the LEDs that light the blades 35 associated to the flow rates lower than the flow rate set by the user.

The continuous adjustment mode recognizes, instead, that the selection of the flow rate will occur through a movement of touch sliding by the user, for example through a sliding contact of his finger on the blades 35 up to a position corresponding to the blade 35 associated to the desired air flow rate. In this case, the electronic control unit 6 sequentially turns on the LEDs associated to the blades 35 touched by the user so as to light them up progressively (FIG. 4).

It should be pointed out that the electronic control unit 6 can be programmed for differentiating the colour and/or intensity of the light emitted by the light-emitting devices 31 in such a way as to be able to light up the blades 35 with different colours and/or light intensities.

In the case in point, the electronic control unit 6 can be programmed for controlling the light-emitting devices 31 in such a way as to light up the blades 35 with a green colour when they are in the condition of selection of the flow rate and with a white colour when they are in the condition of non-selection of the flow rate itself.

With reference to the above description, it should be pointed out that, in the example shown in FIG. 1, the user interface 2 is structured in such a way that the control panel 10 of the device 8 for controlling the temperature, the panel 22 of the device 20 for controlling the distribution of the air, and the panel 32 of the device for controlling the air flow rate will be set alongside one another, i.e., will be aligned horizontally in such a way as to define a plane portion 40 of a shape that is preferably, but not necessarily, rectangular.

In the case in point, the area 11 for setting of the temperature is set in a left-hand sector of the plane portion 40; the area 33 for selecting the flow rate is set in a right-hand sector of the plane portion 40; whilst the area for selecting 23 the distribution is set in the central sector of the plane portion 40.

In the example shown in FIG. 1, the user interface 2 further comprises a control unit 38 designed to enable a user to impart manually additional vehicle commands.

The control unit 38 comprises a plane portion 41, which has a substantially rectangular shape and is set underneath the plane portion 40 in a position co-planar thereto.

In greater detail, in the example shown in FIG. 1, the plane portion 41 is vertically superimposed on the plane portion 40, in a way contiguous thereto, and comprises a series of activation keys or pushbuttons 42, each of which is associated to a control function of the motor vehicle 1.

In the example illustrated in FIG. 1, the pushbuttons 42 of the portion 41 are arranged in two horizontal rows at pre-set distances from one another in such a way as to satisfy pre-set ergonomic setting rules and are provided each with an outer half-shell having a substantially hemispherical shape and having the profile of a bubble. The bottom portion 41 further comprises a series of graphic icons 43, each of which is set in a position corresponding to a respective pushbutton 42 and is designed to indicate visually the supplementary command of the system, which can be activated by pressing the pushbutton 42 itself.

The control unit 38 further comprises a plurality of light-emitting devices 44, each of which is set facing the plane portion 41 in such a way as to backlight a respective graphic icon 43.

Operation of the control unit 38 of the user interface 2 described above is essentially based upon three different operating conditions: a first operating condition, or key-off condition, in which the user interface 2, given that it is not supplied by an electric power, is inactive, i.e., off, and consequently the light-emitting devices 44 are off and the graphic icons 43 are not visible to the user; a second operating condition, or key-on condition, in which the user interface 2, given that it is supplied by an electric power, turns on the light-emitting devices 44, hence lighting up the graphic icons 43 (for example, in white); and a condition of operation of the controls, in which, following upon contact of a pushbutton 42, the light-emitting device changes the colour of the light emitted, thus determining a change of the colour of the graphic icon 43.

It should be pointed out that the electronic control unit 6 can be programmed for controlling the adjustment module 18b so as to vary the intensity of the light emitted by the light-emitting devices 44 according to the light intensity detected by the lighting sensor 18a. In this way, the adjustment module 18b can control a partial reduction of the light intensity emitted by the light-emitting devices 44, with respect to a nominal value of light intensity in conditions of low environmental lighting, for example at night, or else an increase thereof in conditions of high environmental lighting, for example during the day.

It should be pointed out that the controlled lighting of the icons 43 advantageously enables a better perception and intelligibility of the icons 43 themselves in any conditions of internal/external lighting, preventing any possible problems of disturbance and reflection.

The user interface 2 described above is extremely advantageous in so far as, in addition to being particularly inexpensive to provide, is structured in such a way as to present a high degree of "usability", i.e., it is extremely simple, practical, and intuitive.

In particular, the user interface 2, thanks to its own surface in view that is continuous and homogeneous, integrating controls/pushbuttons, is able to prevent any problem regarding plays and profiles, colour matching and penetration of dust generally present on currently known user control interfaces for motor vehicle uses.

In addition, the user interface 2, thanks to the change of lighting of the controls during he changes of state, is able to attract in an extremely effective way the attention of the user on the state of the control itself.

In addition, the user interface 2 is extremely versatile in so far as it enables activation or otherwise of the graphic icons associated to the pushbuttons, thus preventing the need for buttons and/or false buttons or plugs.

Finally, it is clear that modifications and variations can be made to the user interface described above, without thereby departing from the scope of the present invention, as defined by the attached claims.

The invention claimed is:

1. An apparatus, comprising:
   an automotive user interface to control temperature, air distribution, and air flow rate in a ventilation system of a motor vehicle, the automotive user interface comprising a touch-sensitive control display unit, the touch-sensitive control display unit comprising:
   an air temperature control device that includes:
      a first plurality of light-emitting devices including a first set and a second set of light-emitting devices, the first set in respective fixed locations corresponding to respective temperatures including a minimum temperature indicia and a maximum temperature indicia, to illuminate the respective locations at different times to provide a visual representation of temperatures according to a generally circular arrangement;
      a first optically semitransparent, touch-sensitive control panel superimposed on the first set of the first plurality of light-emitting devices, the first touch-sensitive control panel including a slider wheel disposed inside the generally circular arrangement of the first set of the first plurality of light-emitting devices; and
      a first electronic control unit connected to the first plurality of light-emitting devices and to the first optically semitransparent touch-sensitive control panel, the first electronic control unit, configured to control a temperature of the air in the ventilation system to a user selected temperature selected by a user contacting the first optically semitransparent, touch-sensitive control panel at the slider wheel and to control activation of the first set of the first plurality of light-emitting devices to provide a visual representation, positioned outside of the slider wheel and spaced apart from the contact at the slider wheel touch, of the user selected temperature;
   an air flow rate control device that includes:
      a third plurality of light-emitting devices to provide a visual representation of a flow rate of air,
      a third optically semitransparent touch-sensitive control panel superimposed on the third plurality of light-emitting devices; and
      a third electronic control unit connected to the third plurality of light-emitting devices and to the third control panel, the third electronic control unit configured to control a flow of air of the ventilation system to an air flow rate selected by the user contacting the third optically semitransparent, touch-sensitive control panel and to control the third light-emitting devices to provide a visual indication of the contact.

2. The apparatus according to claim 1, wherein the first optically semitransparent touch-sensitive control panel has a generally circular display element, which is provided with a series of temperature intervals and circumscribes the slider wheel with display marks arranged around the generally circular display element in radial positions set at equal angular distances apart.

3. The apparatus according to claim 2, wherein the first plurality of light-emitting devices comprise a plurality of LEDs, which are set facing the first optically semitransparent touch-sensitive control panel according to a substantially circular configuration to backlight the first optically semitransparent touch-sensitive control panel.

4. The apparatus according to claim 3, wherein the first electronic control unit is to control the first plurality of light-emitting devices in response to a touch contact of the user on a single sector of the slider wheel of the first optically semitransparent touch-sensitive control panel.

5. The apparatus according to claim 3, wherein the first electronic control unit is to control the first plurality of light-emitting devices in response to at least one of a group including continuous and sequential touch contact of the user on a plurality of sectors of the slider wheel of the first optically semitransparent touch-sensitive control panel.

6. The apparatus according to claim 5, wherein the first electronic control unit is to control the first set of light-emitting devices in response to the sequential touch contact.

7. The apparatus according to claim 2, wherein the first optically semitransparent touch-sensitive control panel is to present a graphic representation of a pushbutton at a center of the circular display element; and
   wherein the second set of the first plurality of light-emitting devices are positioned to backlight the first optically semitransparent touch-sensitive control panel in an area corresponding to the pushbutton, with the first electronic control unit to control the second set of the light-emitting devices in response to a pushbutton touch.

8. The apparatus according to claim 1, wherein the touch-sensitive control display unit comprises:
   an air distribution selection control device including:
   a second plurality of light emitting devices to provide a visual representation air distribution,
   a second optically semitransparent touch-sensitive control panel superimposed on the second plurality of light-emitting devices; and
   a second electronic control unit connected to the second plurality of light-emitting devices and to the second touch-sensitive control panel, the second electronic control unit, configured to control the ventilation system to distribute air according to a user set air distribution selected by the user contacting the second optically semitransparent, touch-sensitive control panel and to control the second plurality of light-emitting devices to provide a visual representation of the user set air distribution.

9. The apparatus according to claim 8, wherein the second touch-sensitive control panel comprises a series of portions of area to select air distribution, and includes representative graphics associated with a human body portion to which air is directed, wherein a combination of the respective representative graphics defines a whole person in a sitting position.

10. The apparatus according to claim 9, wherein the second plurality of light-emitting devices are to backlight portions of the second touch-sensitive control panel corresponding to the portions of area for selection of the air distribution, wherein the second electronic control unit is to activate the second plurality of light-emitting devices in response to the contact on the second optically semitransparent, touch-sensitive control panel.

11. The apparatus according to claim 8, wherein the second touch-sensitive control panel presents a graphic representation of at least one pushbutton to control activation of an auxiliary air-distribution function, wherein the second plurality of light-emitting devices are to backlight the second touch-sensitive control panel in an area corresponding to the pushbutton to control activation of the auxiliary air-distribution function; and wherein the second electronic control unit is to control the second plurality of light-emitting devices according to a touch of the pushbutton to control activation of an auxiliary air-distribution function.

12. The apparatus according to claim 1, wherein the air flow rate control device includes a graphical representation that includes a series of fan blades set radially and angularly spaced from one another and having at least some respective progressively increasing area dimensions.

13. The apparatus according to claim 12, wherein the third plurality of light-emitting devices are set facing the third touch-sensitive control panel to backlight the graphical representations of the series of fan blades, wherein the third electronic control unit is to activate the third plurality of light-emitting devices in response to a touch contact of a user on the series of fan blades of the third touch-sensitive control panel.

14. The apparatus according to claim 13, wherein the third electronic control unit is to control the third light-emitting devices to light up the graphical representation in response to the touch contact of the user on the series of fan blades.

15. The apparatus according to claim 13, wherein the third electronic control unit is to control the third plurality of light-emitting devices to light up the graphical representation in response to a sequential touch contact by a user on a series of fan blades.

16. The apparatus according to claim 15, wherein the third touch-sensitive control panel is a capacitive touch panel.

17. A system, comprising:
a ventilation system to couple to a motor vehicle; and
an automotive user interface to control a temperature, air distribution, and air flow rate in the ventilation system of the motor vehicle, the interface comprising a touch-sensitive control display unit, the touch-sensitive control display comprising:

an air temperature setting device that includes a first plurality of light-emitting devices, in respective fixed locations corresponding to different temperatures including a minimum temperature indicia and a maximum temperature indicia, to illuminate the respective locations at different times to provide a visual representation of temperatures according to a generally circular arrangement;

a first optically semitransparent, touch-sensitive control panel superimposed on the first plurality of light-emitting devices, the first touch-sensitive control panel including a slider wheel disposed inside the generally circular arrangement of the first plurality of light-emitting devices;

a first electronic control unit connected to the first plurality of light-emitting devices and to the first optically semitransparent touch-sensitive control panel, the first electronic control unit, configured to control a temperature of the air in the ventilation system to a user selected temperature selected by a user contacting the first optically semitransparent, touch-sensitive control panel at the slider wheel and to control activation of the first plurality of light-emitting devices to provide a visual representation, outside of the slider wheel and spaced apart from the contact at the slider wheel touch, of the user selected temperature;

an air flow rate control device that includes a second plurality of light-emitting devices, in respective fixed locations corresponding to different air flow rates, to illuminate the respective fixed locations of the second plurality of light-emitting devices at different times to provide a visual representation of air flow rates;

a second optically semitransparent, touch-sensitive control panel superimposed on the second plurality of light-emitting devices; and a second electronic control unit connected to the second plurality of light-emitting devices and to the second optically semitransparent touch-sensitive control panel, the second electronic control unit configured to control a flow of air of the ventilation system to an air flow rate selected by the user contacting the second optically semitransparent, touch-sensitive control panel and to control the second plurality of light-emitting devices to provide a visual indication of the contact.

18. The system according to claim 17, wherein the first and second touch-sensitive control panels are capacitive touch panels.

\* \* \* \* \*